United States Patent [19]

Logan et al.

[11] 4,025,218

[45] May 24, 1977

[54] DRILLING MACHINE

[75] Inventors: Francis D. Logan; Leonard M. Dybala, both of Houston, Tex.

[73] Assignee: Camco, Incorporated, Houston, Tex.

[22] Filed: Nov. 10, 1975

[21] Appl. No.: 630,250

[52] U.S. Cl. .................................. 408/11; 408/10; 408/130
[51] Int. Cl.² .................. B23B 39/04; B23B 47/22
[58] Field of Search ................. 408/11, 6, 130, 702, 408/4, 13, 9, 10

[56] References Cited

UNITED STATES PATENTS

| | | | |
|---|---|---|---|
| 1,914,400 | 6/1933 | Burrell | 408/130 X |
| 2,424,138 | 7/1947 | Barr | 408/11 X |
| 2,790,340 | 4/1957 | Cross | 408/6 X |
| 2,857,789 | 10/1958 | Robinson | 408/11 |
| 2,863,339 | 12/1958 | Emrick | 408/11 |
| 2,922,323 | 1/1960 | Weidner | 408/130 X |
| 2,928,297 | 3/1960 | Svenson | 408/11 |
| 3,039,329 | 6/1962 | Gajda | 408/130 |
| 3,107,403 | 10/1963 | Newton | 408/11 X |
| 3,336,821 | 8/1967 | Firth | 408/11 X |
| 3,342,087 | 9/1967 | Mulot | 408/130 X |
| 3,452,671 | 8/1969 | Stumpf et al. | 408/130 X |

FOREIGN PATENTS OR APPLICATIONS 993,260   5/1965   United Kingdom .................. 408/9

*Primary Examiner*—Francis S. Husar
*Assistant Examiner*—William R. Briggs
*Attorney, Agent, or Firm*—Fulbright & Jaworski

[57] ABSTRACT

A drilling machine having a base supporting a pair of ways on which moves a drill tool support having a drill spindle for holding a drill tool. A hydraulic piston and cylinder assembly positioned on each side of the drill spindle for moving the tool support along the ways. A workpiece holding chuck is positioned in the middle of the support ways and the drill spindle and hydraulic piston and cylinder assemblies are positioned in the same plane with the ways for preventing torque being applied to a drill tool and maintaining axial drilling forces on the drill spindle thereby allowing a drill to drill a straight hole in a workpiece held in the holding chuck. A control system is provided for supplying fluid to the piston and cylinder assemblies, but all of the drilling forces are carried by the piston and cylinder assemblies. In addition, means are provided for monitoring the drilling pressure applied to the piston and cylinder assemblies for indicating the drilling pressure and for automatically stopping drilling when a predetermined pressure is reached.

10 Claims, 4 Drawing Figures

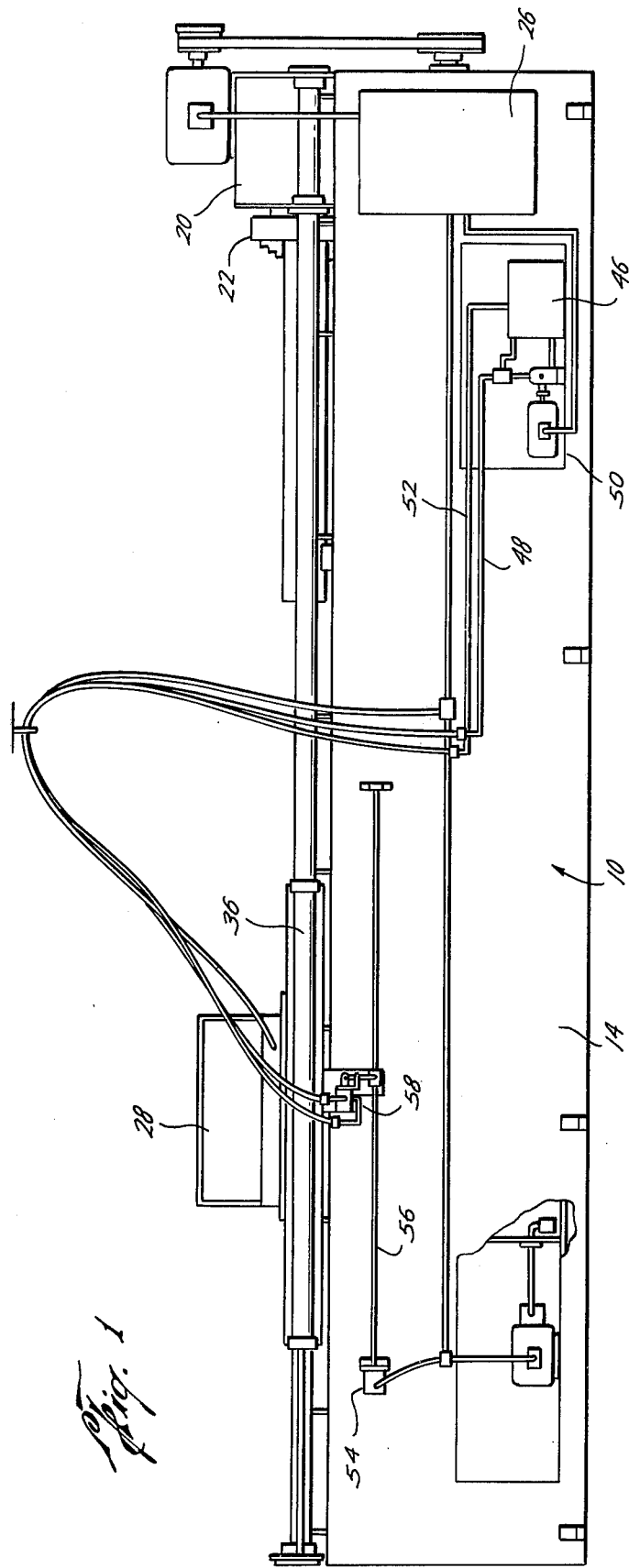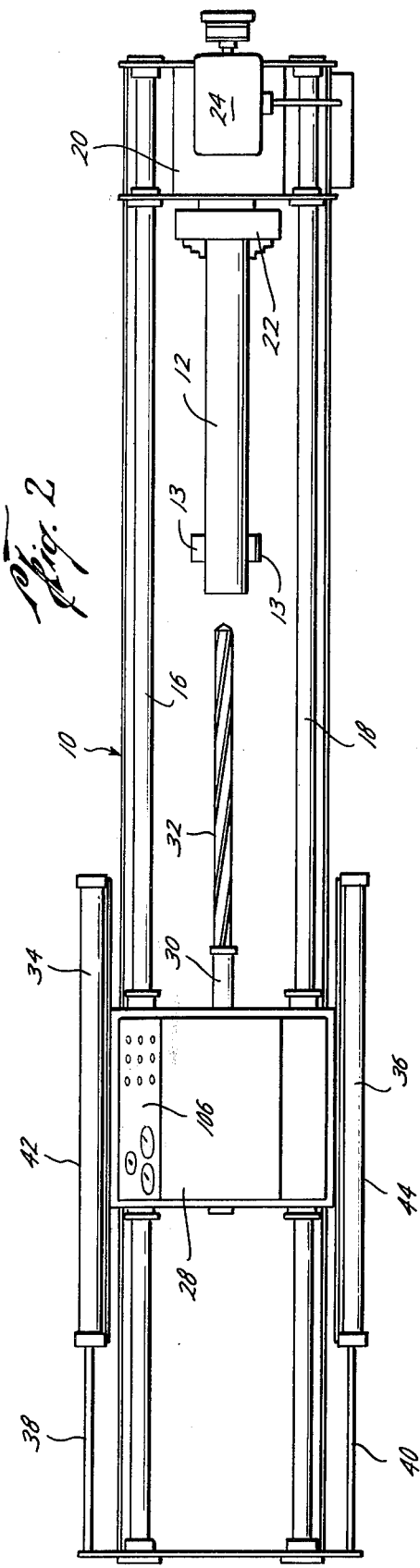

DRILLING MACHINE

BACKGROUND OF THE INVENTION

Generally, the use of a drilling machine to drill holes in a workpiece is old. However, the present invention is directed to an improved drilling machine to insure that the drilling forces are applied axially through the drill so as to drill a straight hole instead of applying off-center forces to the drill which tend to cause the drill bit to deflect and drill unstraight or non-axial holes. In addition, in the past, excessive drilling forces have been applied, particularly when the drill is dull, which results in breaking the drill and/or damaging the workpiece and drilling machine. Another improvement of the drilling machine of the present invention is the provision of a control system for applying fluid to piston and cylinder assemblies which in turn apply all of the drilling forces to the drill tool. The system includes means for monitoring the fluid pressure to provide an indication and/or means for stopping drilling when the pressure applied to the piston and cylinder assemblies reaches a predetermined value.

SUMMARY

The present invention is directed to an improved drilling machine for drilling holes in a workpiece and includes a base supporting a pair of support ways with a workpiece holding chuck positioned in the middle of the support ways. A drill tool support is slidably supported from the ways for longitudinal movement and includes a drill spindle positioned in the middle of the support ways for holding a drill tool. A hydraulic piston and cylinder assembly is connected to the tool support on each side of the drill spindle for moving the tool support along the ways. The drill spindle and hydraulic piston and cylinder assemblies are positioned in the same plane with the ways for providing only an axial drilling force on the drill spindle thereby allowing the drill in the spindle to drill a straight hole in the workpiece held in the holding chuck.

A still further object of the present invention is the provision of a control system for applying fluid to the piston and cylinder assemblies whereby all of the drilling forces are carried by the piston and cylinder assemblies. Preferably, the control system includes a lead screw driven by a motor with a valve controlling the application of fluid to the piston and cylinder assemblies. The valve is connected to and actuated by the lead screw.

A still further object of the present invention is the provision of a control system for applying fluid to the piston and cylinder assemblies which includes means for monitoring the drilling pressure applied to the piston and cylinder assemblies. The monitoring means may include an indicator indicating the drilling pressure and/or include means such as a pressure switch for stopping the application of fluid to the assemblies when the pressure of the fluid reaches a predetermined value.

Yet a still further object of the present invention is the provision of piston and cylinder assemblies which include a double acting piston and means for applying fluid to either side of the piston with a variable speed reversible motor connected to the lead screw of the control system in which a pressure switch monitors the drilling pressure controls the motor so as to reverse the motor if a predetermined value of drilling pressure is reached.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is a side elevational view of the drilling machine of the present invention, FIG. 2 is a top elevational view of the drilling machine of FIG. 1.

DESCRIPTION OF THE PREFERRED EMBODIMENT

Figure 3:
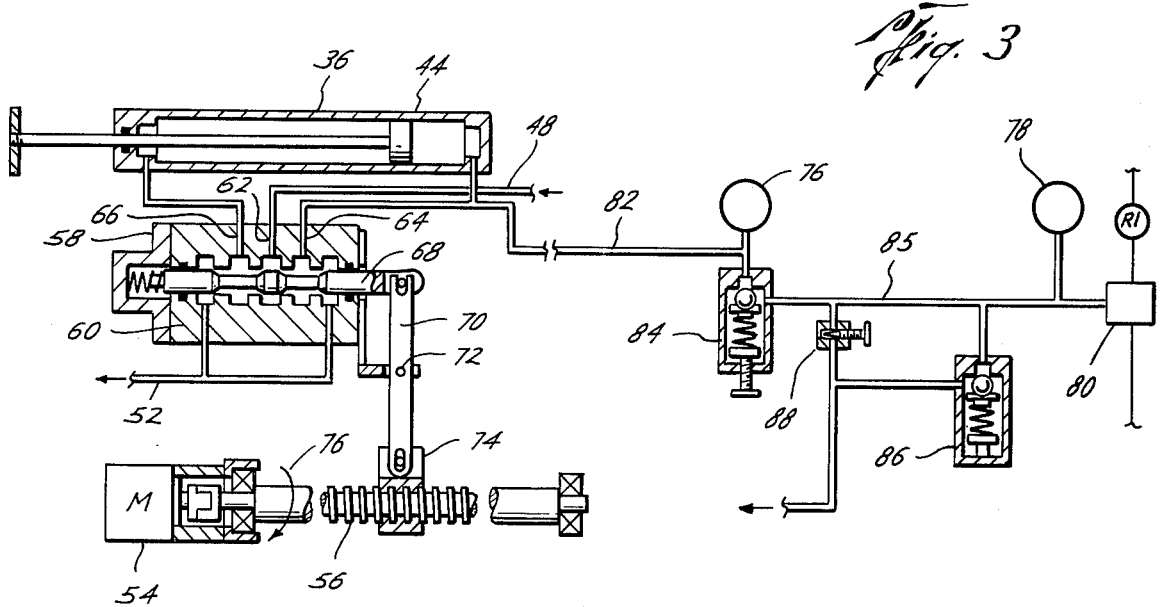
FIG. 3 is a schematic of the hydraulic portion of the control system for controlling the operation of the drilling machine.

Referring now to the drawings, and particularly to FIGS. 1 and 2, the reference numeral 10 generally indicates the drilling machine of the present invention for drilling holes, for example only, of up to 5 inches in diameter and 6 feet long in a workpiece 12. The apparatus 10 generally includes a suitable base 14 which supports a pair of ways 16 and 18, which may be circular steel rods extending along the length of the machine 10. A head stock 20 is secured to the ways 16 and 18 and includes a workpiece holding chuck 22 having an axis positioned in the middle of the support ways 16 and 18. A motor 24 is provided driving a set of gears 26 or conventionally rotating the chuck 22 at a selected rate of rotation.

A drill tool support 28 is slidably supported from the ways 16 and 18 for horizontal movement along the ways and the support 28 includes a drill spindle 30 for holding a suitable drill tool 32. A hydraulic piston and cylinder assembly 34 and 36 are connected to the tool support 28 on opposite sides of the drill spindle 30 for moving the tool support 28, the spindle 30 and the drill tool 32 towards and away from the rotating workpiece 12 one end of which is held in chuck 22 and the other end which may be supported by rollers 13. The axis of the drill spindle 30 and the axis of the hydraulic piston and cylinder assemblies 34 and 36 are positioned in the same plane with the ways 16 and 18, here shown as horizontal, thereby causing the drill tool 32 to drill a straight hole in the workpiece 12. That is, prior art devices which apply a force to the drilling spindle offset from the axis of the drilling spindle 30 have a tendency, particularly under heavy drilling forces to cause the drill tool 32 to deflect from a straight line. The provision of the piston and cylinder assemblies 34 and 36 being equally spaced from and on opposite sides of the drill spindle 30 applies a drilling force directly through the axis of the drilling spindle 30 regardless of the drilling force. This results in good tool life, good size control and allows the use of an efficient drilling speed. One of each piston and cylinder, here shown as the piston rods 38 and 40, is secured to the ways 16 and 18, and the other, such as the cylinders 42 and 44, are connected to and move with the drill tool support 28.

As best seen in FIG. 1, a tank 46 is provided for holding the hydraulic fluid for actuation of the piston and cylinder assemblies 34 and 36. A line 48 is provided connected to conventional hydraulic power supply 50 for providing pressurized hydraulic fluid and a line 52 is provided to discharge return hydraulic fluid from the piston and cylinder assemblies 34 and 36 to the tank 46.

Figure 4:
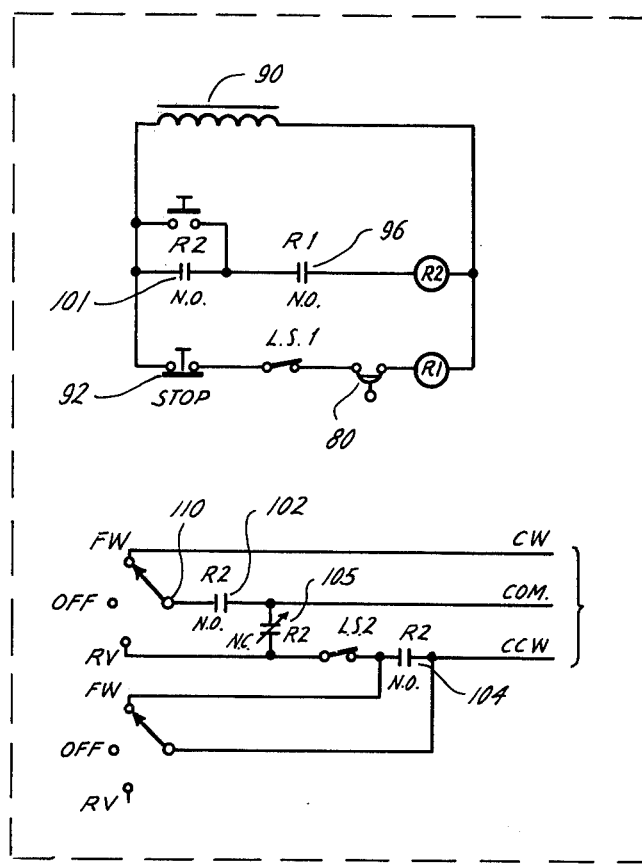
FIG. 4 is an electrical schematic of the electrical portion of the control system.

Referring to FIGS. 1, 3 and 4, a control system is shown for controlling the actuation of the piston and cylinder assemblies 34 and 36. A motor 54, preferably a variable speed reversible stepping motor is connected to and drives a lead screw 56 which in turn controls a hydraulic valve 58. The valve 58 includes a housing 60 having an inlet 62 connected to the hydraulic supply line 48, and outlets 64 and 66 each of which is connected to the hydraulic piston and cylinder assemblies 34 and 36, shown in FIG. 3 as being connected only to assembly 36 for clarity. Outlet 64 is connected to the cylinders 42 and 44 on one side of the pistons for moving the cylinders 42 and 44 in a direction to move the drill tool 32 towards the workpiece 12. The outlet 66 is connected to the cylinders 42 and 44 on the opposite side of the pistons for reversing the direction of longitudinal movement of the drill tool 32. The valve 58 includes a valve spool 68 which is connected to and actuated by a lever 70 which pivots about pin 72 and is connected to a follower nut 74 connected to the lead screw 56. The valve 58 is connected to and moves with the support 28. Thus, assuming the motor 54 is rotated in the direction of the arrow 76, the nut 74, the lead screw 56 is rotated in the same direction to move nut 74 to the right thereby moving the spool 68 to the left relative to the valve housing 60 providing communication between the valve inlet 62 and the valve outlet 64 to supply fluid to the cylinders 42 and 44 on the side of the piston causing the drill tool support 28 to carry the drill tool 32 towards the workpiece 12. It is to be noted that the valve 58 acts as a pressure regulator and that the valve 58, assemblies 34 and 36, the support 28 and drill tool 32 will move along as the lead screw 56 rotates. It is also noted that the feed rate is not affected by changes in oil viscosity or cutting pressure changes and all of the cutting forces are carried by the hydraulic assemblies 34 and 36. On the other hand, if the motor 54 is reversed, the lead screw 56 will be reversed causing the spool 68 to move to the right shutting off the flow of fluid from the valve inlet 62 to the valve outlet 64 and opening communication between the valve inlet 62 and the valve outlet 66 to reverse the piston and cylinder assemblies 34 and 36 to withdraw the drill tool 32 from the workpiece 12.

Furthermore, the action of the control system insures that the pressure in the system need be no more than required to do the work which results in an efficient use of power. Any variation of the tool load is automatically compensated for without changing the feed rate which is controlled by the speed of the stepping motor 54.

Another feature of the present invention is the provision of means for monitoring the drill pressure applied to the drill tool 32. For example, if the drill tool 32 becomes dull and does not cut at the proper rate, the drilling forces will become excessive causing the drill tool 32 to break and possibly damaging the workpiece 12 and/or the drilling machine 10. The control system may include means for monitoring the pressure applied to the drill tool 32 such as indicating means which may include one or more pressure gauges 76 and 78 and/or may include means for stopping the application of hydraulic fluid to the assemblies 34 and 36 if the pressure of the hydraulic fluid reaches a predetermined value, such as pressure switch 80. For example, the pressure gauge 76 may be connected to the assemblies 34 and 36 through line 82 and may be a 600 pound per square inch hydraulic pressure gauge which shows the exact pressure required to move the support 28 and drill tool 32 against the workpiece 12. When the drill tool 32 touches the workpiece 12, which resists the movement of the drill tool 32, the valve 58 opens wider supplying additional hydraulic fluid to the assemblies 34 and 36 raising the pressure to that required to drill the workpiece 12, such as to 200 pounds. However, as the drill tool 32 becomes dull, the pressure in the system will increase and the machine operator by observing the pressure on the gauge 76 has an indication of the condition of the drill tool 12. In order to increase the sensitivity of monitoring the pressure in the system, a conventional pressure regulator 84 may be provided to reduce the pressure in a branch line 85, for example, to 20 pounds, which is monitored by a 100 psi gauge 78 which is easier to read than the gauge 76. Any increase in pressure is indicated on both gauges 76 and 78 pound for pound. For example, if the first gauge 76 goes from 200 to 230 pounds, the second gauge 78 would move from 20 to 50 pounds. The pressure switch 80 is connected to the branch line 85 and is set to a predetermined value above which it is not desired to drill, and to reverse the motor 54 and withdraw the drill tool 32 from the workpiece 12, as will be more fully described hereinafter. If desired, a relief valve 86 may be provided, which may be set, for example, at 70 pounds, and is used to protect gauge 78, and a bleed off valve 88 may be provided to bleed off excess pressure in the system.

Referring now to FIG. 4, the electrical portion of the control system is best seen in which power is supplied through a transformer 90 whereby current flows through the stop switch 92, a limit switch LS1 which is only opened when the drill tool 32 reaches the extent of its forward drilling depth, and the pressure switch 80, which is normally closed, and actuates relay R1 thereby closing contacts 96. With the forward-off-reverse switch 100 in the forward direction, the Start button is pushed and energizes relay R2 which closes normally opened contacts 101, 102 and 104 and opens contacts 105. Power is then applied through the switch 100 to the motor 54 to rotate the motor 54 in a clockwise direction 76 as shown in FIG. 3. As previously explained, rotation of the lead screw 56 actuates the valve 58 to apply hydraulic fluid from the supply line 48 to the piston and cylinder assemblies 34 and 36 in a direction to move the support 28 and drill tool 32 towards the workpiece 12. The speed of the stepping motor 54 is selected from a control panel 106 on the support 28, that is calibrated in inches per minute to normally provide a constant speed to control the feed rate of the drill tool 32. Drilling of the workpiece 12 may continue and the operator, if he desires, may visually observe the pressure gauges 76 and 78 to note whether the drilling pressure is satisfactory. However, even in the event that the operator is not carefully monitoring the operation of the drilling machine 10, the pressure switch 80 will be actuated in the event that the drilling pressure becomes excessive, for example 50 pounds, and will open causing relay R1 to be de-energized which in turn opens contact 96 and de-energizes relay R2. De-energization of R2 opens contacts 101, 102, and 104, but closes contact 105. Closure of contact 105 provides a path from the electrical common line through contact 105, limit switch LS2 and the forward switch 100 to reverse the electrical power to the stepping motor 54 to retract the drill tool 32 from the workpiece 12 before any damage can occur. The motor will reverse until limit switch LS2 is actuated by movement of the support 28 to the extreme retracted position. Therefore, the control system will automatically prevent drilling on the machine 10 if the drilling pressure is excessive.

The present invention, therefore, is well adapted to carry out the objects and attain the ends and advantages mentioned as well as others inherent therein. While a presently preferred embodiment of the invention has been given for the purpose of disclosure, numerous changes may be made without departing from the spirit and scope of the invention as hereinafter claimed.

We claim:

1. A drilling machine comprising,
   a base,
   a pair of support ways supported from the base,
   a workpiece holding chuck having an axis positioned in the middle of support ways,
   a drill tool support slidably supported from the ways for longitudinal movement along the ways, the drill support including a drill spindle positioned in the middle of the support ways for holding a drill tool,
   a hydraulic double acting piston and cylinder assembly connected to the tool support on each side of the drill spindle moving the tool support along the ways,
   said drill spindle and said hydraulic piston and cylinder assemblies positioned in the same plane with the ways providing only an axial drilling force on the drill spindle thereby allowing a drill in the spindle to drill a straight hole in a workpiece held in the holding chuck, and
   means applying fluid to the piston and cylinder assemblies including,
      a valve connected to and moving with the drill tool support controlling the application of fluid to both sides of said pistons,
      a movable means connected to and actuating the valve, and
      a reversible stationary motor connected to and moving the movable means and actuating said valve 2. A drilling machine comprising,
   a base,
   a pair of support ways supported from the base,
   a workpiece holding chuck having an axis positioned in the middle of the support ways,
   a drill tool support slidably supported from the ways for longitudinal movement along the ways, the drill support including a drill spindle positioned in the middle of the support ways for holding a drill tool,
   a hydraulic piston and cylinder assembly connected to the tool support on each side of the drill spindle moving the tool support along the ways,
   said drill spindle and hydraulic piston and cylinder assemblies positioned in the same plane with the ways providing only an axial drilling force on the drill spindle thereby allowing a drill in the spindle to drill a straight hole in a workpiece held in the holding chuck,
   means applying fluid to the piston and cylinder assemblies, said means including,
      a lead screw,
      a motor connected to and driving the lead screw,
      a valve controlling the application of fluid to the piston and cylinder assemblies, said valve connected to and actuated by the lead screw,
   means stopping the application of fluid if the pressure of the fluid reaches a predetermined value, said means including,
      a pressure switch connected to the piston and cylinder assemblies and actuated when the pressure applied to the assemblies reaches a predetermined value and limiting the actuation of the motor.

3. The apparatus of claim 2 wherein the motor is a variable speed motor.

4. A drilling machine comprising,
   a base,
   a pair of support ways supported from the base,
   a workpiece holding chuck having an axis positioned in the middle of the support ways,
   a drill tool support slidably supported from the ways for longitudinal movement along the ways, the drill support including a drill spindle positioned in the middle of the support ways for holding a drill tool,
   a hydraulic piston and cylinder assembly connected to the tool support on each side of the drill spindle moving the tool support along the ways, said piston and cylinder assemblies include a double acting piston,
   said drill spindle and hydraulic piston and cylinder assemblies positioned in the same plane with the ways providing only an axial drilling force on the drill spindle thereby allowing a drill in the spindle to drill a straight hole in a workpiece held in the holding chuck,
   means applying fluid to the piston any cylinder assemblies, said means including means applying fluid to either side of the piston and further including,
      a lead screw,
      a reversible motor connected to and driving the lead screw,
      a valve controlling the application of fluid to both sides of said pistons, said valve connected to and actuated by the lead screw.

5. The apparatus of claim 4 including,
   means connected to the piston and cylinder assemblies indicating the pressure being applied to said assemblies.

6. The apparatus of claim 4 including,
   a pressure switch connected to the piston and cylinder assemblies and actuated if the drilling pressure applied to the assemblies reaches a predetermined value and connected to and reversing the motor if the predetermined value is reached.

7. A drilling machine comprising,
   a base,
   a pair of horizontal support ways supported from the base,
   a workpiece holding chuck having a horizontal axis positioned in the middle of the support ways,
   a drill tool support slidably supported from the ways for horizontal movement along the ways, the drill support including a drill spindle having an axis positioned in the middle of the support ways for holding a drill tool,
   a horizontal double acting hydraulic piston and cylinder assembly connected to the tool support on each side of the drill spindle for moving the tool support along the ways, said drill spindle and said assemblies positioned in the same plane with the ways for providing only an axial drilling force on the drill spindle thereby allowing a drill in the spindle to drill a straight hole in a workpiece held in the holding chuck, a lead screw, a reversible motor connected to and driving the lead screw, a valve controlling the application of fluid to both sides of said pistons, said valve connected to and actuated by the lead screw, means connected to the piston and cylinder assemblies monitoring the drilling pressure applied to the assemblies.

8. The apparatus of claim 7 wherein the monitoring means includes, a pressure switch connected to the assemblies and actuated if the drilling pressure applied to the assemblies reaches a predetermined value and connected to and reversing the motor if the predetermined value is reached.

9. The apparatus of claim 8 wherein the monitoring means includes a pressure indicator.

10. The apparatus of claim 7 wherein the motor is a variable speed motor.

* * * * *

UNITED STATES PATENT OFFICE
CERTIFICATE OF CORRECTION

Patent No. 4,025,218　　　　　　　　Dated May 24, 1977

Inventor(s) Francis D. Logan and Leonard M. Dybala

It is certified that error appears in the above-identified patent and that said Letters Patent are hereby corrected as shown below:

Column 1, line 65, after "switch" insert -- which --

Column 2, line 32, change "or" to -- for --

Column 3, line 55, change "drill" to -- drilling --

Column 5, line 20, after "of" insert -- the --

Column 5, line 45, after "valve" insert -- . --

Column 6, line 34, change "any" to -- and --

Signed and Sealed this

Thirteenth Day of September 1977

[SEAL]

Attest:

RUTH C. MASON  
Attesting Officer

LUTRELLE F. PARKER  
Acting Commissioner of Patents and Trademarks